United States Patent
Roether et al.

(10) Patent No.: US 8,918,262 B2
(45) Date of Patent: Dec. 23, 2014

(54) MODULARLY DESIGNED PRESSURE CONTROL DEVICE OF A FLUID PRESSURE BRAKE SYSTEM OF A VEHICLE

(75) Inventors: Friedbert Roether, Cleebronn (DE); Adnan Mustapha, Maulbronn (DE); Gerhard Wieder, Besigheim (DE); Dirk Brenner, Stuttgart (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 204 days.

(21) Appl. No.: 13/583,497

(22) PCT Filed: Mar. 8, 2011

(86) PCT No.: PCT/EP2011/053141
§ 371 (c)(1),
(2), (4) Date: Dec. 3, 2012

(87) PCT Pub. No.: WO2011/110459
PCT Pub. Date: Sep. 15, 2011

(65) Prior Publication Data
US 2013/0073165 A1 Mar. 21, 2013

(30) Foreign Application Priority Data
Mar. 8, 2010 (DE) .......................... 10 2010 010 606

(51) Int. Cl.
*B60T 7/12* (2006.01)
*B60T 8/1761* (2006.01)
*B60T 8/32* (2006.01)
*B60T 8/36* (2006.01)
*B60T 8/48* (2006.01)
*B60T 13/68* (2006.01)
*B60T 11/28* (2006.01)

(52) U.S. Cl.
CPC ............... *B60T 8/1761* (2013.01); *B60T 8/327* (2013.01); *B60T 8/361* (2013.01); *B60T 8/4818* (2013.01); *B60T 13/683* (2013.01); *B60T 11/28* (2013.01)
USPC .......................................................... 701/78

(58) Field of Classification Search
None
See application file for complete search history.

(56) References Cited

U.S. PATENT DOCUMENTS

| 6,048,040 A | 4/2000 | Ross |
| 2006/0152075 A1 | 7/2006 | Goebels et al. |

FOREIGN PATENT DOCUMENTS

| DE | 44 25 789 | 1/1996 |
| DE | 100 38 046 | 2/2002 |

(Continued)

OTHER PUBLICATIONS

European Patent Office, International Preliminary Report on Patentability, Sep. 25, 2012, from International Patent Application No. PCT/EP2011/053141, filed on Mar. 8, 2011.

(Continued)

*Primary Examiner* — Thomas Tarcza
*Assistant Examiner* — Garrett Evans
(74) *Attorney, Agent, or Firm* — Kenyon & Kenyon LLP (57) ABSTRACT

A pressure control device of a vehicle, including a pressure controller of a fluid pressure brake system for brake slip-dependent control, including a relay valve having a supply port supplied by a supply pressure, a venting port connected to a pressure sink, a control port and at least two working ports, in which a working port is assigned to at least one brake cylinder and the other working port is assigned to at least one brake cylinder of another wheel, in which each working port of the relay valve is connected to a 2/2-way valve controlled by a control unit and assigned to a respective vehicle side and establishes a connection between the relevant working port and the assigned brake cylinder or blocks the connection, depending on control unit actuation, and in which the control port of the relay valve is connectable to a brake control pressure formed in accordance with the braking input, to a supply pressure of a pressure reservoir or to a pressure sink by a valve system formed by one 3/2-way or two 2/2-way solenoid valves and controlled by the control unit.

15 Claims, 6 Drawing Sheets

(56) References Cited

FOREIGN PATENT DOCUMENTS

| DE | 102 36 922 | 3/2004 |
|----|------------|--------|
| EP | 0 274 610  | 7/1988 |
| EP | 0 604 864  | 7/1994 |

OTHER PUBLICATIONS

European Patent Office, English Translation of International Preliminary Report on Patentability and Written Opinion, Sep. 25, 2012, from International Patent Application No. PCT/EP2011/053141, filed on Mar. 8, 2011.

International Search Report for PCT/EP2011/053141, dated Mar. 8, 2011.

MODULARLY DESIGNED PRESSURE CONTROL DEVICE OF A FLUID PRESSURE BRAKE SYSTEM OF A VEHICLE

FIELD OF THE INVENTION

The present invention relates to a pressure control device of a fluid pressure brake system of a vehicle for the at least brake slip-dependent control of brake pressures in brake cylinders of each individual wheel of an axle.

BACKGROUND INFORMATION

A pressure control device of this kind is discussed in DE 102 36 922 A1, for example, wherein the pressure control device is configured as a 2-channel pressure control module and contains a two-channel valve unit with one relay valve per channel, and each of the two relay valves is assigned just one solenoid control valve configured as a 3/2-way valve. Brake slip control can be carried out separately for the two channels. However, relay valves, in particular, of which the known 2-channel pressure control module has two, involve a certain complexity of construction.

SUMMARY OF THE INVENTION

It is therefore an object of the exemplary embodiments and/or exemplary methods of the present invention to refine a pressure control device of the type mentioned at the outset in such a way that, despite offering brake slip control of each individual wheel, it can be produced at lower cost. Moreover, the intention is that the pressure control device should be constructed in such a way that it can be expanded in a simple manner in terms of its control functions merely by adding individual components, e.g. as regards expansion by a drive slip control system (ASR), a vehicle dynamics control system (ESP) or by an electronic brake system (EBS).

According to the exemplary embodiments and/or exemplary methods of the present invention, this object may be achieved by the features described herein.

The exemplary embodiments and/or exemplary methods of the present invention are based on the aspect that the pressure control device
  a) contains a single relay valve having a supply port that is supplied by a supply pressure, a venting port connected to a pressure sink, a control port and at least two working ports, wherein one working port is assigned to at least one brake cylinder of a wheel on one vehicle side of the axle and the other working port of the single relay valve is assigned to at least one brake cylinder of a wheel on the other vehicle side of the axle, wherein
  b) each working port of the relay valve is connected to a 2/2-way valve, which is controlled directly or indirectly by a control unit and assigned to a respective vehicle side and which either establishes a connection between the relevant working port of the relay valve and the assigned brake cylinder or blocks said connection, depending on actuation by the control unit,
  c) the control port of the relay valve can be connected either to a brake control pressure (p4) formed in accordance with the driver's braking input, to a supply pressure of a pressure reservoir or to a pressure sink by a valve system formed by one 3/2-way solenoid valve or by two 2/2-way solenoid valves and controlled by the control unit.

Thus, the pressure control device according to the exemplary embodiments and/or exemplary methods of the present invention comprises just four basic elements: the single relay valve, the valve system, which comprises just one 3/2-way solenoid valve or two 2/2-way solenoid valves, and the two 2/2-way valves. With these valves, which can be produced relatively easily and at relatively low cost, brake slip control of each individual wheel can be achieved within certain limits, that is to say, for example, a pressure buildup or pressure reduction at a wheel brake cylinder on one vehicle side while the pressure is simultaneously maintained in a wheel brake cylinder on the other vehicle side. However, an opposed pressure profile (pressure reduction, pressure buildup) at wheels on different vehicle sides is not possible.

In particular, just one single relay valve is used to achieve control of large pressure medium cross sections in the brake cylinders of each individual wheel, inter alia by a central, relatively small control pressure flow. As a result, the pressure control device can be produced at very low cost overall.

Advantageous developments and improvements of the present invention indicated herein are possible by the further measures presented herein.

According to a particular embodiment, the 2/2-way valves are diaphragm valves, which are pneumatically pilot-controlled by respective 3/2-way solenoid pilot control valves electrically controlled by the control unit and assigned to the same vehicle side. It is thereby possible to feed large pressure medium flows into the brake cylinders relatively quickly by small control pressure medium flows.

In this case, the 3/2-way solenoid pilot control valves may be configured in such a way that, on the one hand, they pass a supply pressure of a pressure reservoir or the control pressure formed in accordance with the driver's braking input to a control port of the assigned 2/2-way valve or, on the other hand, connect said control port to a pressure sink, depending on control by the control unit.

The case where the 3/2-way solenoid pilot control valves pass the control pressure formed in accordance with the driver's braking input to the control port of the assigned 2/2-way valve has the advantage that, if the ABS is in a pressure holding phase during a driver-initiated braking operation and the driver releases the brake pedal during this pressure holding phase, the control pressure formed in accordance with the driver's braking input falls and hence the assigned 2/2-way valve, which is closed during the pressure holding phase, can open in order to dissipate brake pressure (pressure lowering). As a result, the driver obtains greater influence and can "override" the ABS functions.

In the other case, where the 3/2-way solenoid pilot control valves pass the supply pressure of the pressure reservoir to the control port of the assigned 2/2-way valve, release of the brake pedal during a pressure holding phase of the ABS would not lead to a lowering of the brake pressure in the brake cylinder. This would only be possible as part of the next ABS cycle (pressure lowering), although without the possibility of intervention by the driver.

In this case, the control unit is configured in such a way that brake slip control of each individual wheel is implemented as part of the typical ABS functions of increasing the pressure, maintaining the pressure and reducing the pressure to achieve optimum wheel slip by control of at least the valve system and the 2/2-way valves, each assigned to one vehicle side.

Taking this ABS-compatible basic layout as a starting point, drive slip control (ASR) is achieved by the valve system interacting in such a way with just one single solenoid valve electrically controlled by the control unit that the control port of the single relay valve is connected to the control pressure formed in accordance with the driver's braking input, a supply pressure of a pressure reservoir or to a pressure sink in accordance with the drive slip of the wheels of the axle.

In an advantageous manner, the ABS-compatible basic layout of the pressure control device is therefore supplemented by just one single solenoid valve in order additionally to achieve drive slip control (ASR) of each individual wheel. It may be preferred here if the single additional solenoid valve is a 3/2-way solenoid valve if the valve system is likewise formed by just one 3/2-way solenoid valve.

In this case, the control unit is configured in such a way that, in addition to the ABS functions, drive slip control (ASR) of each individual wheel is also achieved by control at least of the single additional solenoid valve.

However, if the valve system comprises two 2/2-way solenoid valves, one 2/2-way solenoid valve may be an outlet valve which either connects the control port of the single relay valve to a pressure sink or blocks said connection, and the other 2/2-way solenoid valve is, in particular, a valve which can also be used as a backup valve of an EBS which either connects the control port of the single relay valve to the control pressure formed in accordance with the driver's braking input or blocks said connection. In this case, the single additional solenoid valve provided for achieving the drive slip control of the axle is an inlet valve configured as a 2/2-way solenoid valve.

By the inlet valve, the outlet valve and the backup valve, it is then possible to form not only a drive slip control system but also an electronic brake system (EBS) with a higher-priority electropneumatic brake circuit and a lower-priority pneumatic brake circuit, which furthermore contains at least one pressure sensor in pressure-transmitting connection with at least one working port of the single relay valve.

For this purpose, the ABS-compatible basic layout having a valve system consisting of two 2/2-way solenoid valves (outlet valve, backup valve) for controlling the single relay valve is supplemented by just one inlet valve configured as a 2/2-way solenoid valve in order, together with at least one pressure sensor and a suitably programmed control unit, to form a complete electronic brake system (EBS) including drive slip control for the relevant axle.

In this case, the control unit is configured in such a way that, in addition to performing the ABS and ASR functions, it adapts the actual brake pressure measured by the at least one pressure sensor to a desired brake pressure formed in accordance with the driver's braking input by controlling the inlet valve and the outlet valve in order to provide brake pressure control.

To form a vehicle dynamics control system ESP, just one further pressure sensor for measuring the control pressure formed in accordance with the driver's braking input is provided. At least one pressure control device of the type described is then assigned to each axle on the vehicle. The ESP expands the ABS/ASR control system by the variables which describe the movement of the vehicle, i.e. by the transverse dynamics, by forming a corrective yawing moment in the case of oversteer or understeer. This corrective yawing moment is then converted into a wheel slip by braking individual wheels or a number of wheels by the pressure control device according to the present invention.

For example, the control unit is configured in such a way that it controls at least the valve system and the single additional solenoid valve in such a way when there is a braking operation initiated by the vehicle dynamics control system ESP that the control port of the relay valve is supplied with the supply pressure of the pressure reservoir in accordance with the yaw rate of the vehicle, the 2/2-way valve assigned to one brake cylinder on one vehicle side is switched to the through flow position, and the 2/2-way valve assigned to the other brake cylinder on the other vehicle side is switched to the blocking position.

Overall, the various expansion stages based on the ABS-compatible basic layout differ by just one single valve for the purpose of additionally achieving an ASR function, an EBS or an EBS with vehicle dynamics control ESP. The result is a modular construction of the pressure control device without the need to modify the structure of each expansion stage with its simpler scope in order to be able to integrate the valve to be added into the structure.

Further measures that improve the exemplary embodiments and/or exemplary methods of the present invention are explained in greater detail below with reference to the drawing, together with the description of illustrative embodiments of the present invention.

DETAILED DESCRIPTION

Figure 1:
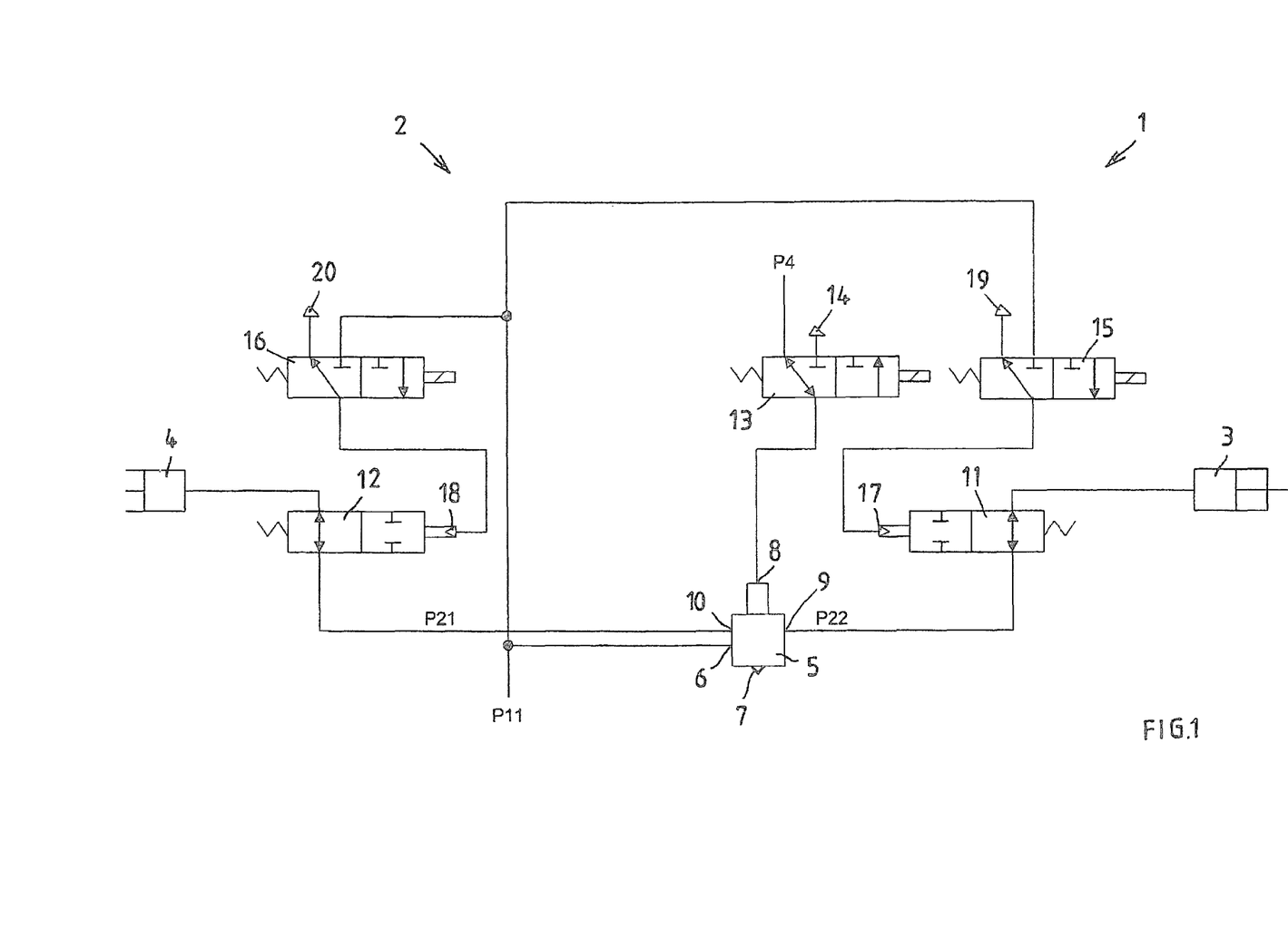
FIG. 1 shows a circuit diagram of a pressure control device of a pneumatic vehicle brake system with ABS in accordance with an exemplary embodiment of the present invention.

In FIG. 1, 1 designates an exemplary embodiment of a pressure control device, which comprises a valve unit 2 and an electronic unit, connected directly thereto mechanically and electrically, as a control unit, which is not illustrated here owing to the scale of the drawing. According to the exemplary embodiment, the pressure control device 1 is integrated into an air brake system of a commercial vehicle.

The pressure control device 1 is configured for the at least brake slip-dependent control of brake pressures in brake cylinders 3, 4 of each individual wheel of an axle, e.g. a driven axle. For this purpose, it comprises a single relay valve 5 having a supply port 6 that is supplied by a supply pressure p11, a venting port 7 connected to a pressure sink, a control port 8 and two working ports 9, 10.

In this arrangement, one working port 9 is assigned to one brake cylinder 3 of a wheel on one vehicle side of the axle and the other working port 10 of the single relay valve 5 is assigned to the brake cylinder 4 of the wheel on the other vehicle side of the axle to enable a brake pressure p21 to be fed into brake cylinder 4 or a brake pressure p22 to be fed into brake cylinder 3. Each working port 9, 10 of the relay valve 5 is furthermore connected to a 2/2-way valve 11, 12, which is controlled, which may be indirectly, by the control unit and assigned to a respective vehicle side.

The 2/2-way valves 11, 12 either establish a connection between the relevant working port 9, 10 of the relay valve 5 and the assigned brake cylinder 3, 4 or block said connection, depending on control, which in this case may be indirect, by the control unit.

According to the embodiment in FIG. 1, the control port 8 of the relay valve can be connected either to a brake control pressure p4 formed in accordance with the driver's braking input or to a pressure sink 14 by a valve system formed by, for example, one 3/2-way solenoid valve 13 and controlled by the control unit. The 3/2-way solenoid valve 13 may be spring loaded and, when deenergized, is therefore preloaded into the operating position in which it connects the control port 8 of the relay valve 5 to the brake control pressure p4 formed in accordance with the driver's braking input. When energized, on the other hand, the control port 8 of the relay valve 5 is connected to the pressure sink 14.

In this case, the brake control pressure p4 formed in accordance with the driver's braking input is produced by a driver-actuated foot brake module, for example (not shown here).

In a particular embodiment, the 2/2-way valves 11, 12 are pneumatically controlled diaphragm valves which may be pneumatically pilot-controlled by respective 3/2-way solenoid pilot control valves 15, 16 electrically controlled by the control unit and assigned to the same vehicle side. In this case, the 3/2-way solenoid pilot control valves 15, 16 may be configured in such a way that, on the one hand, they pass the supply pressure p11 of the pressure reservoir to a control port 17, 18 of the assigned 2/2-way valve 11, 12 or, on the other hand, connect said control port 17, 18 to a pressure sink 19, 20, depending on control by the control unit. The 3/2-way solenoid pilot control valves 15, 16 may be spring loaded and, when deenergized, are therefore preloaded into the operating position in which they connect the control port 17, 18 of the assigned 2/2-way valve 11, 12 to the pressure sink.

When deenergized, on the other hand, the control ports 17, 18 of the 2/2-way valves 11, 12 are connected to the pressure sink 19, 20.

In this case, the control unit is configured in such a way that brake slip control of each individual wheel is implemented as part of the typical ABS functions of increasing the pressure, maintaining the pressure and reducing the pressure to achieve an optimum desired wheel slip by control of the 3/2-way solenoid valve 13 and of the two 3/2-way solenoid pilot control valves 15, 16 for indirect control of the 2/2-way valves 11, 12. For calculation of the actual brake slip, the control unit receives information on the wheel speeds of the wheels of the axle in a known manner via wheel speed sensors (not shown here).

Given this background, the following mode of operation of the pressure control device 1 illustrated in FIG. 1 is obtained:

During a normal service braking operation, the central 3/2-way solenoid valve 13 for pilot control of the relay valve 15 and the two 3/2-way solenoid pilot control valves 15, 16 are in the spring-actuated deenergized normal position shown in FIG. 1, and therefore the 3/2-way solenoid valve 13 connects the control port 8 of the relay valve 5 to the brake control pressure p4 formed in accordance with the driver's braking input. Consequently, the relay valve 5 modulates said brake control pressure p4 to give brake pressures p21 and p22, respectively, at the two working ports 9, 10 thereof. Since the two 3/2-way solenoid pilot control valves 15, 16 are likewise in the deenergized normal position thereof, the pneumatic control ports 17, 18 of the two 2/2-way valves 11, 12 are connected to the respective pressure sinks 19, 20, and are therefore in the through flow position shown in FIG. 1 in order to feed the brake pressures p21 and p22 available at the working ports 9, 10 of the relay valve 5 into the brake cylinders 3, 4 respectively. Here, the brake pressures p21 and p22 for one vehicle side and the other vehicle side are of substantially the same magnitude.

During an ABS- or brake slip-controlled braking operation with a tendency to lock up on just one side, the 3/2-way solenoid valve 13 is initially energized and thereby switched to the venting position thereof, in which the control port 8 of the relay valve 5 is connected to the pressure sink 14. As a result, both working ports 9, 10 of the relay valve 5 are connected to the pressure sink 7 thereof. At the same time, the 3/2-way solenoid pilot control valve 15 on the vehicle side on which there is no wheel lockup is energized by the control unit and thereby switched to the position in which the control port 17 of the relevant 2/2-way valve is supplied with the supply pressure p11. As a result, the 2/2-way valve 11 switches to the blocking position thereof and thereby maintains the brake pressure p22 in the brake cylinder 3 of the non-locking wheel (pressure holding). On the vehicle side on which wheel lockup has been detected, on the other hand, the 3/2-way solenoid pilot control valve 16 is not switched over by the control unit but remains in the deenergized normal position thereof, in which the control port 18 of the relevant 2/2-way valve 12 remains connected to the pressure sink 20. As a result, the 2/2-way valve 12 remains in the through flow position thereof shown in FIG. 1, as a result of which the brake pressure p21 in the brake cylinder 4 of the locking wheel can dissipate via the pressure sink 7 of the relay valve 5 (pressure lowering).

In the illustrative embodiments shown in FIG. 2 to FIG. 6, those parts which remain the same and have the same action as in the illustrative embodiment are denoted by the same reference signs.

Figure 2:
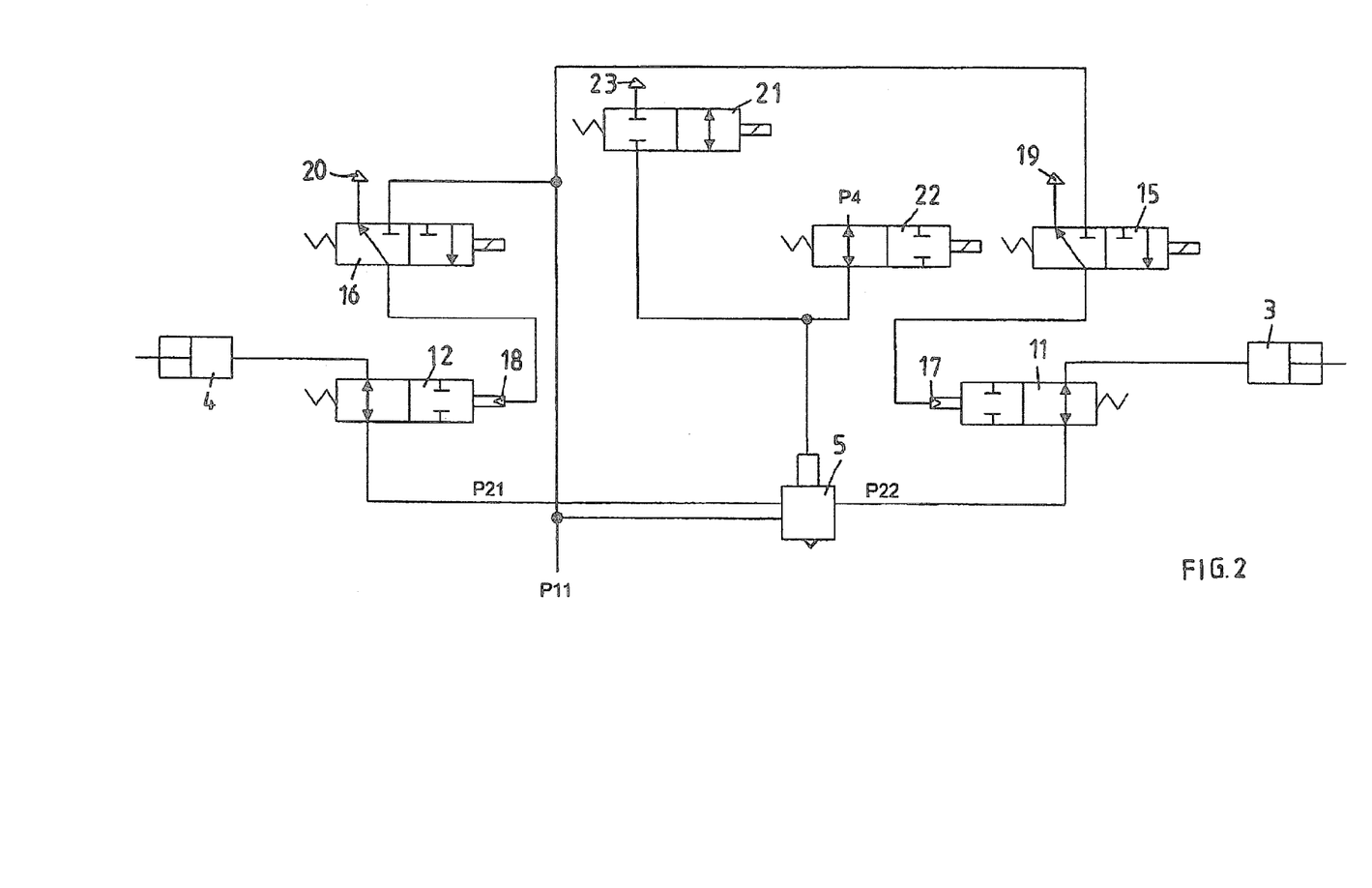
FIG. 2 shows a circuit diagram of a pressure control device of a pneumatic vehicle brake system with ABS in accordance with another embodiment of the present invention.

In the illustrative embodiment in FIG. 2, the valve system consists not of a single 3/2-way solenoid valve but of two 2/2-way solenoid valves 21, 22, wherein one 2/2-way solenoid valve 21 acts as an outlet valve, either connecting the control port 8 of the relay valve 5 to a pressure sink 23 or blocking said connection, as shown. On the other hand, the other 2/2-way solenoid valve 22 either connects the control port 8 of the relay valve 5 to the brake control pressure p4 formed in accordance with the driver's braking input or blocks said connection. Both 2/2-way solenoid valves 21, 22 are spring loaded into the normal position thereof shown in FIG. 2, in which one 2/2-way solenoid valve 21 is switched to the blocking position and the other 2/2-way solenoid valve 22 is switched to the through flow position.

Given this background, the following mode of operation of the pressure control device 1 illustrated in FIG. 2 is obtained:

During a normal service braking operation, one 2/2-way solenoid valve 21 is in the deenergized blocking position, while the other 2/2-way solenoid valve 22 is in the through flow position. Moreover, the two 3/2-way solenoid pilot control valves 15, 16 are also in the spring-actuated deenergized normal position shown in FIG. 2, with the result that the other 2/2-way solenoid valve 22 connects the control port 8 of the relay valve 5 to the brake control pressure p4 formed in accordance with the driver's braking input, as FIG. 2 shows. As described above, the relay valve 5 modulates said brake control pressure p4 to give respective brake pressures p21 and p22 at the two working ports 9, 10 thereof. Since the two 3/2-way solenoid pilot control valves 15, 16 are likewise in the deenergized normal position thereof, the pneumatic control ports 17, 18 of the two 2/2-way valves 11, 12 are connected to the respective pressure sinks 19, 20, with the result that they are in the through flow position shown in FIG. 2 in order to feed the brake pressures p21 and p22 available at the working ports 9, 10 of the relay valve 5 into the brake cylinders 3, 4 respectively. Here, the brake pressures p21 and p22 for one vehicle side and the other vehicle side are of substantially the same magnitude.

During an ABS- or brake slip-controlled braking operation with a tendency to lock up on just one side, one 2/2-way solenoid valve is energized as an outlet valve 21 and is thereby switched to the through flow position thereof, in which the control port 8 of the relay valve 5 is connected to the pressure sink 23. The other 2/2-way solenoid valve 22 is also energized and is thereby switched to the blocking position thereof, thereby decoupling the control port 8 of the relay valve 5 from the brake control pressure p4. As a result, both working ports 9, 10 of the relay valve 5 are connected to the pressure sink 7 thereof. The two 3/2-way solenoid pilot control valves 15, 16 are switched in the manner described with respect to the previous illustrative embodiment, and therefore the 2/2-way valve 11 on the non-locking vehicle side is switched to the blocking position thereof, as a result of which the brake pressure p22 in the brake cylinder 3 of the non-locking wheel is maintained (pressure holding). On the vehicle side on which wheel lockup has been detected, on the other hand, the 3/2-way solenoid pilot control valve 16 is not switched over by the control unit but remains in the deenergized normal position thereof, in which the control port 18 of the relevant 2/2-way valve 12 remains connected to the pressure sink 20. As a result, the 2/2-way valve 12 remains in the through flow position thereof shown in FIG. 2, as a result of which the brake pressure p21 in the brake cylinder 4 of the locking wheel can dissipate via the pressure sink 7 of the relay valve 5 (pressure lowering).

Figure 3:
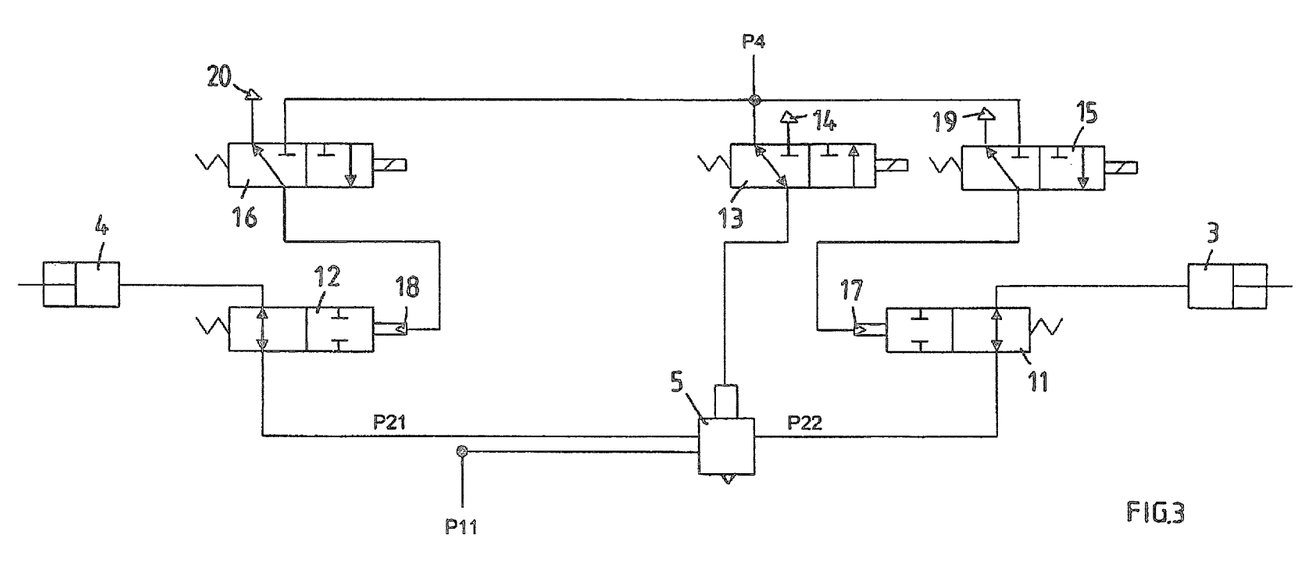
FIG. 3 shows a circuit diagram of a pressure control device of a pneumatic vehicle brake system with ABS in accordance with another embodiment of the present invention.

According to the embodiment in FIG. 3, in contrast to the embodiments shown in FIG. 1 and FIG. 2, it is not a supply pressure p11 of a pressure reservoir but the brake control pressure p4 formed in accordance with the driver's braking input which is connected to the control ports 17, 18 of the 2/2-way valves 11, 12 via the two 3/2-way solenoid pilot control valves 15, 16. If the ABS is then in a pressure holding phase during a driver-initiated braking operation and the driver releases the brake pedal during this pressure holding phase, the control pressure p4 formed in accordance with the driver's braking input falls and hence the assigned 2/2-way valves 11 and 12, which are closed during the pressure holding phase, can open in order to reduce brake pressures p21 and p22 (pressure lowering).

Figure 4:
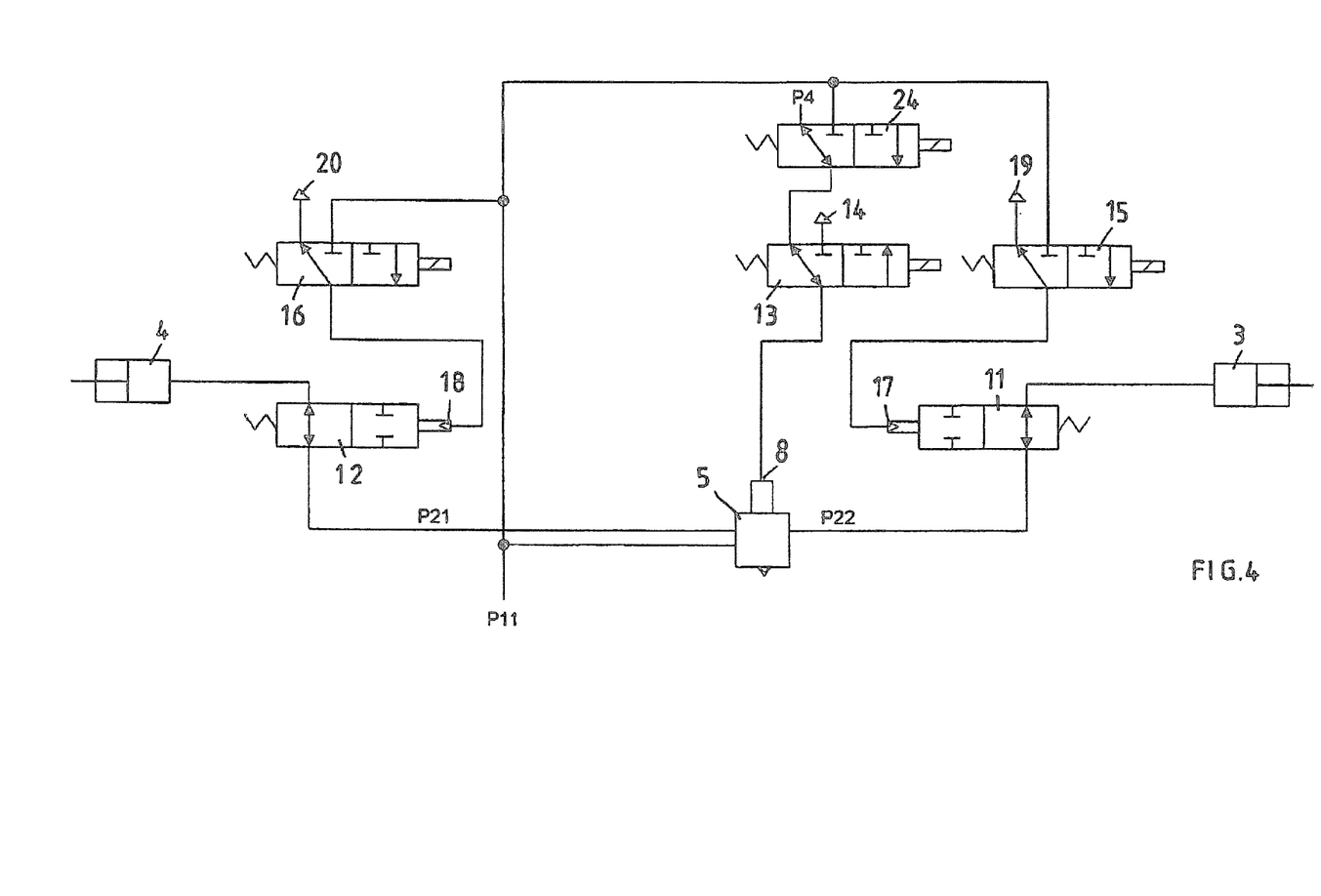
FIG. 4 shows a circuit diagram of a pressure control device of a pneumatic vehicle brake system with ABS and ASR in accordance with an exemplary embodiment of the present invention.

To achieve drive slip control (ASR), the ABS-compatible basic layout shown in FIG. 1 to FIG. 3 is supplemented by just one solenoid valve 24 in accordance with the embodiment in FIG. 4, said valve being electrically controlled by the control unit. This solenoid valve 24 then interacts with the valve system 13 in such a way that the control port 8 of the single relay valve 5 is connected to the control pressure p4 formed in accordance with the driver's braking input, the supply pressure p11 of the pressure reservoir or to a pressure sink 14 in accordance with the drive slip of the wheels of the axle. As an option here, the single additional solenoid valve is a 3/2-way solenoid valve 24, and the valve system is likewise formed by a 3/2-way solenoid valve 13 in a manner similar to FIG. 1.

In this case, the control unit is configured in such a way that, in addition to the ABS functions, drive slip control (ASR) of each individual wheel is also achieved by control at least of the additional 3/2-way solenoid valve. As regards the control of the relay valve 5, this additional 3/2-way solenoid valve 24 is inserted ahead of the 3/2-way solenoid valve 13 forming the valve system. In the spring-loaded deenergized normal position thereof, it transmits the control pressure p4 formed in accordance with the driver's braking input to the 3/2-way solenoid valve 13 and, in the energized operating position thereof, it transmits the supply pressure p11 to said valve.

In the case where the drive slip at the two wheels of the axle is not excessive, the additional ASR valve 24 transmits the control pressure p4 formed in accordance with the driver's braking input to the 3/2-way solenoid valve 13, with the result that the control port 8 of the relay valve 5 is supplied with air or vented as described in relation to the illustrative embodiment in FIG. 1, depending on whether the control pressure p4 formed in accordance with the driver's braking input represents a brake release control pressure or a brake application control pressure. In the case of a brake release control pressure p4, i.e. when the foot brake valve is not actuated, the relay valve 5 outputs only low brake release pressures p21 and p22 respectively to the working ports 9, 10 thereof, thus releasing both wheel brake cylinders 3, 4.

In the case of an impermissible drive slip, on the other hand, the additional ASR valve 24 transmits the supply pressure p11 to the 3/2-way solenoid valve 13, which is switched to the through flow position in relation thereto, as a result of which the control port 8 of the relay valve 5 is supplied with a brake application control pressure and therefore outputs a brake application pressure to the working ports 9, 10 thereof. The operating positions of the 3/2-way solenoid pilot control valves 15, 16 and of the two 2/2-way valves 11, 12 are then as shown in FIG. 4, with the result that the wheel brake cylinders 3, 4 of the axle are applied temporarily to provide wheel slip control while the impermissible wheel slip is present.

Figure 5:
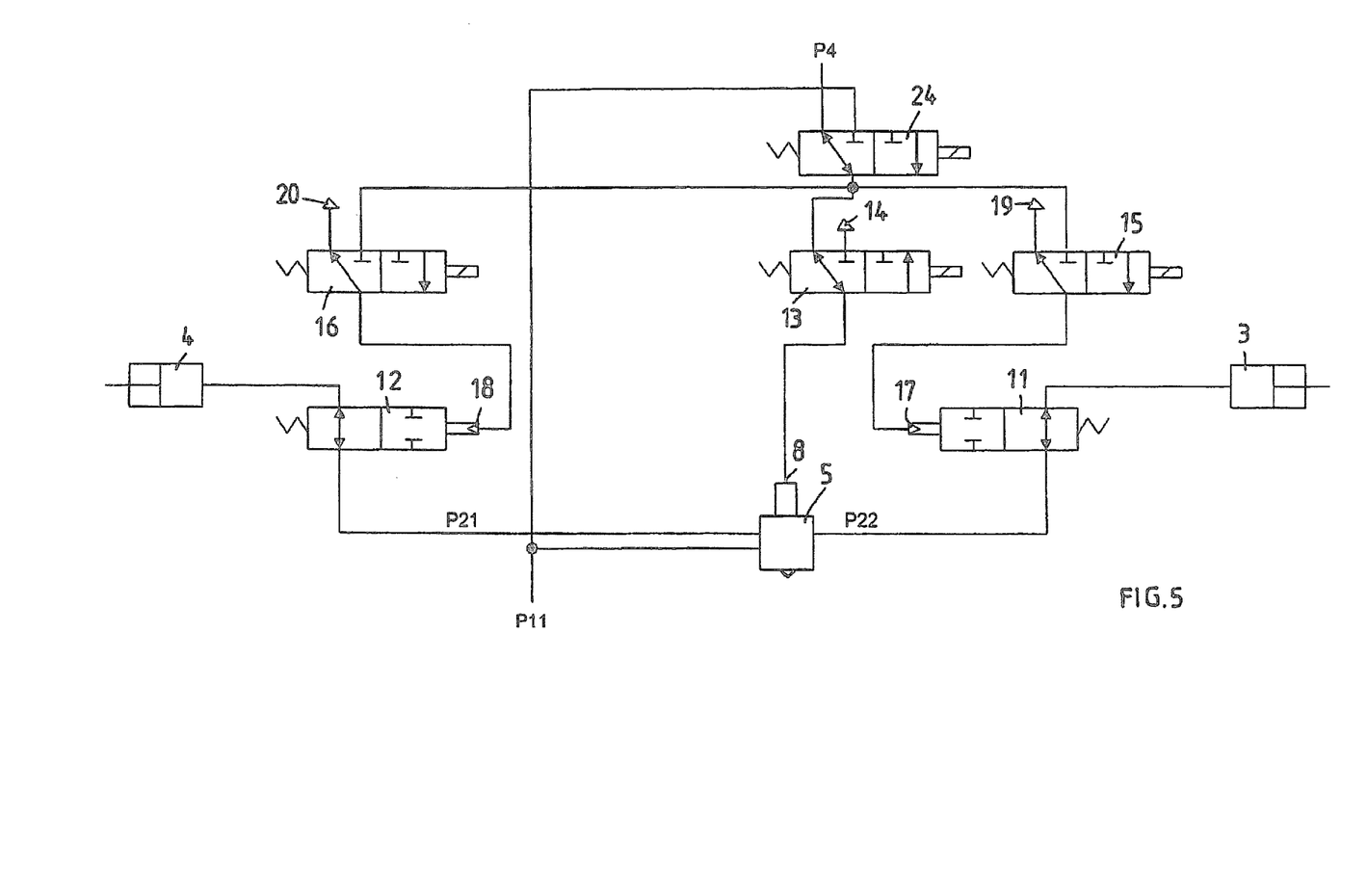
FIG. 5 shows a circuit diagram of a pressure control device of a pneumatic vehicle brake system with ABS and ASR in accordance with an exemplary embodiment of the present invention.

According to an embodiment which is an alternative to the above and is shown in FIG. 5, it is, as in the embodiment in FIG. 3, not the supply pressure p11 of the pressure reservoir but the brake control pressure p4 formed in accordance with the driver's braking input which is connected to the control ports 17, 18 of the two 2/2-way valves 11, 12 via the two 3/2-way solenoid pilot control valves 15, 16. If the ASR is then in a pressure holding phase and the driver actuates the brake pedal during this pressure holding phase, the control pressure p4 formed in accordance with the driver's braking input rises, allowing the assigned 2/2-way valves 11 and 12, which are closed during the pressure holding phase, to open in order to build up brake pressures p21 and p22 (pressure increase).

Figure 6:
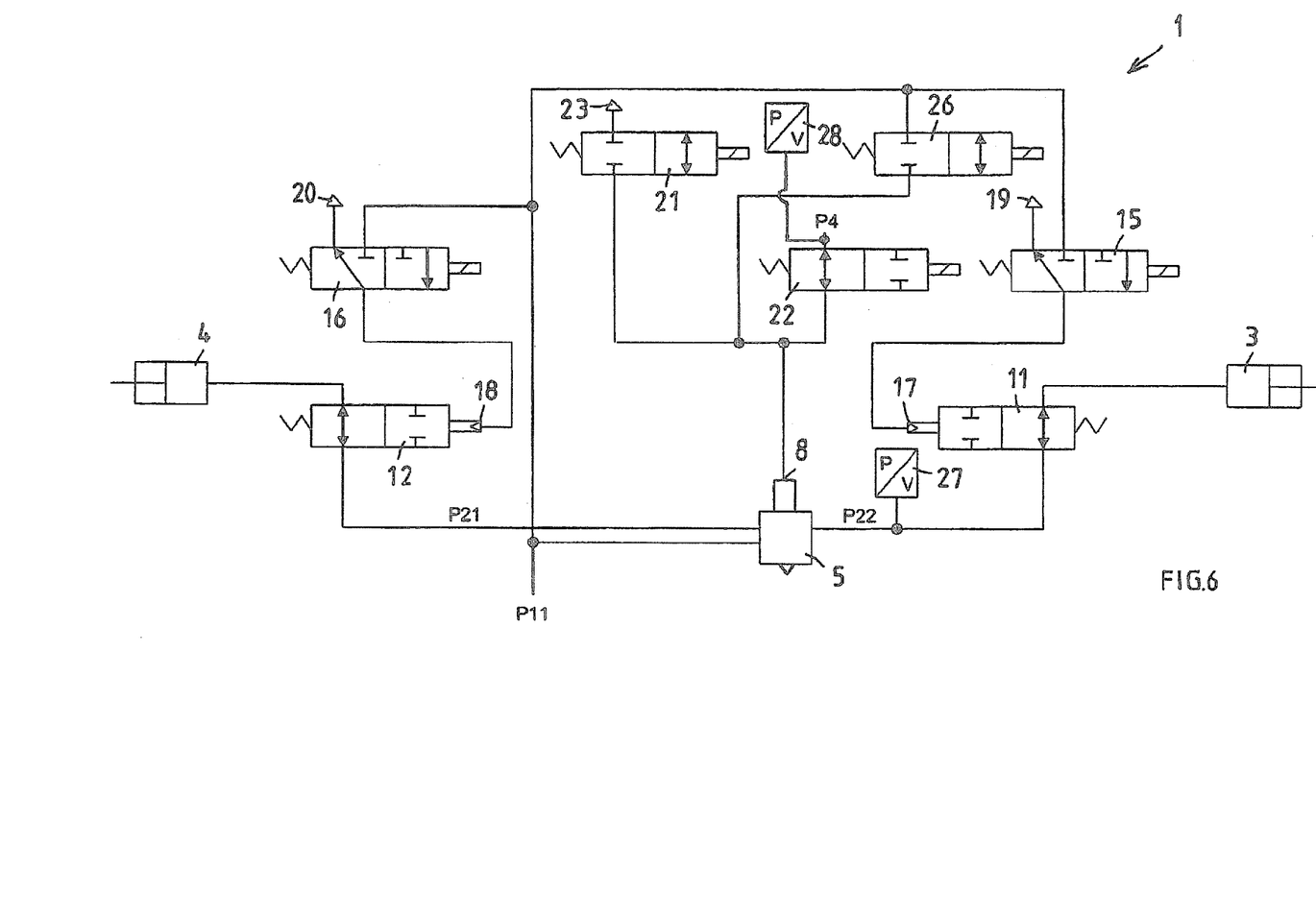
FIG. 6 shows a circuit diagram of a pressure control device of a pneumatic vehicle brake system configured as an electronic brake system EBS with ABS/ASR and ESP functionality in accordance with an exemplary embodiment of the present invention.

If the valve system does not include a 3/2-way solenoid valve 13 but two 2/2-way solenoid valves 21, 22 as shown in FIG. 3 and FIG. 6, one 2/2-way solenoid valve 21 may be an outlet valve which either connects the control port 8 of the relay valve 5 to the pressure sink 23 thereof or blocks said connection. The other 2/2-way solenoid valve 22 is, in particular, a valve which can also be used as a backup valve of an EBS, which either connects the control port 8 of the relay valve 5 to the control pressure p4 formed in accordance with the driver's braking input or blocks said connection. According to the embodiment in FIG. 6, the single additional solenoid valve provided for achieving the drive slip control of the axle may be an inlet valve 26 configured as a 2/2-way solenoid valve.

According to FIG. 6, the inlet valve 26, the outlet valve 21 and the backup valve 22 then form not only a brake slip control system (ABS) and a drive slip control system (ASR) but also an electronic brake system (EBS) with a higher-priority electropneumatic brake circuit and a lower-priority pneumatic brake circuit if, in addition, one working port 9, 10 of the single relay valve 5 is in pressure-transmitting connection with a pressure sensor 27, for example.

In this case, the control unit is configured in such a way that, in addition to carrying out the ABS and ASR functions, it also adapts the actual brake pressure measured by the pressure sensor 27 to a desired brake pressure formed in accordance with the driver's braking input by controlling the inlet valve 26 and the outlet valve 21 in order to provide brake pressure control.

The mode of operation of the EBS is then as follows:

In the course of a normal braking operation, the outlet valve 21 remains in the spring-loaded blocking position thereof, while the inlet valve 26 is switched to the through flow position in order to supply the control port 8 of the relay valve 5 with supply pressure. This ensures a brake application pressure p21 and p22 at the two working ports 9, 10 of the relay valve 5, which is passed through to the wheel brake cylinders 3, 4 via the two opened 2/2-way valves 11, 12. During this process, the backup valve 22 remains in the energized blocking position thereof, thus preventing the control pressure p4 applied to it, which is formed in accordance with the driver's braking input, from being passed through to the control port 8 of the relay valve 5.

However, if the electric brake circuit of the EBS fails, the solenoid valves 15, 16, 21, 22, 26 can no longer be energized. The inlet valve 26 thus switches back to the deenergized and spring-loaded blocking position thereof, thus ensuring that supply pressure no longer reaches the control port 8 of the relay valve 5. The outlet valve 21 likewise remains in the blocking position. The control port 8 of the relay valve 8 is then supplied via the backup valve 22, which is switched to the through flow position under spring load when deenergized, with the control pressure p4 produced by the foot brake valve and formed in accordance with the driver's braking input in order to apply the wheel brake cylinders 3, 4.

The ABS and ASR functions then run as in the embodiments described above, i.e. the control port 8 of the relay valve 5 is, depending on the function involved, connected via the inlet valve 26 to the supply pressure p11, via the backup valve 22 to the control pressure p4 formed in accordance with the driver's braking input or via the outlet valve 21 to the pressure sink 23 of the outlet valve 21.

In another expansion stage, a further pressure sensor 28 for measuring the control pressure p4 formed in accordance with the driver's braking input is provided in addition to the pressure sensor 27 for measuring the brake pressure p21 or p22. If one pressure control device 1 in accordance with FIG. 6 is then provided for each axle, e.g. for a front axle and for a rear axle, vehicle dynamics control (ESP) can be achieved.

In this case, the control unit is configured in such a way that it controls the outlet valve 21, the backup valve 22 and the inlet valve 26 in such a way when there is a braking operation initiated by the vehicle dynamics control system (ESP) that the control port 8 of the relay valve 5 is supplied with the supply pressure p11 of the pressure reservoir in accordance with the yaw rate of the vehicle. For this purpose, for example, the outlet valve 21 and the backup valve 22 are switched to the blocking position thereof, while the inlet valve 26 is switched to the through flow position in order to supply the control port 8 of the relay valve 5 with air.

At the same time, the 3/2-way solenoid pilot control valves 15, 16 are controlled by the control unit in such a way that, for example, the 2/2-way valve 11 assigned to one brake cylinder 3 on one vehicle side is switched to the through flow position in order to supply said brake cylinder with air, and the 2/2-way valve 12 assigned to the other brake cylinder 4 of the other vehicle side is switched to the blocking position in order to isolate said brake cylinder 4 from the pressure buildup. It is self-evident that, when there is a yawing moment building up in the opposite direction, the 2/2-way valve 11 must be switched to the blocking position and the 2/2-way valve 12 must be switched to the through flow position by appropriate control of the 3/2-way solenoid pilot control valves 15, 16.

The list of reference signs is as follows:
1 pressure control device
2 valve unit
3 brake cylinder
4 brake cylinder
5 relay valve
6 supply port RV
7 venting port RV
8 control port RV
9 working port RV
10 working port RV
11 2/2-way valve
12 2/2-way valve
13 3/2-way solenoid valve
14 pressure sink
15 3/2-way solenoid pilot control valve
16 3/2-way solenoid pilot control valve
17 control port
18 control port
19 pressure sink
20 pressure sink
21 outlet valve
22 backup valve
23 pressure sink
24 solenoid valve
26 inlet valve
27 pressure sensor
28 pressure sensor

The invention claimed is:

1. A pressure control device of a vehicle, comprising:
a pressure control arrangement of a fluid pressure brake system of the vehicle for providing at least brake slip-dependent control of brake pressures in brake cylinders of each individual wheel of an axle;
wherein the pressure control arrangement includes a single relay valve having a supply port that is supplied by a supply pressure, a venting port connected to a pressure sink, a control port and at least two working ports, and wherein one of the working ports is assigned to at least one brake cylinder of a wheel on one vehicle side of the axle and the other of the working ports of the relay valve is assigned to at least one brake cylinder of a wheel on the other vehicle side of the axle,
wherein each of the working ports of the relay valve is connected to a 2/2-way valve, which is controlled directly or indirectly by a control unit and assigned to a respective vehicle side and which either establishes a connection between the relevant working port of the relay valve and the assigned brake cylinder or blocks the connection, depending on actuation by the control unit, and
wherein the control port of the relay valve is connectable to a brake control pressure formed in accordance with the driver's braking input, to a supply pressure of a pressure reservoir or to a pressure sink by a valve system formed by one 3/2-way solenoid valve or by two 2/2-way solenoid valves and controlled by the control unit.

2. The pressure control device of claim 1, wherein each 2/2-way valve assigned to one vehicle side is pneumatically pilot-controlled by a respective 3/2-way solenoid pilot control valve electrically controlled by the control unit and assigned to the same vehicle side.

3. The pressure control device of claim 2, wherein the 2/2-way valves include diaphragm valves or booster valves.

4. The pressure control device of claim 2, wherein the 3/2-way solenoid pilot control valves are configured so that they pass a supply pressure of a pressure reservoir or the control pressure formed in accordance with the driver's braking input to a control port of the assigned 2/2-way valve, or connect the control port to a pressure sink, depending on control by the control unit.

5. The pressure control device of claim 1, wherein the control unit is configured so that brake slip control of each individual wheel is achieved by control of at least the valve system and of the respective 2/2-way valves, each assigned to one vehicle side.

6. The pressure control device of claim 1, wherein to achieve drive slip control (ASR), the valve system interacts with a single solenoid valve electrically controlled by the control unit that the control port of the relay valve is connected to the control pressure formed in accordance with the driver's braking input, a supply pressure of a pressure reservoir or to a pressure sink in accordance with the drive slip of the wheels of the axle.

7. The pressure control device of claim 6, wherein the single additional solenoid valve provided for achieving the drive slip control of the axle is a 3/2-way solenoid valve (24).

8. The pressure control device of claim 6, wherein one 2/2-way solenoid valve (21) of the two 2/2-way solenoid valves forming the valve system is an outlet valve which either connects the control port of the relay valve to a pressure sink or blocks the connection, and wherein the other 2/2-way solenoid valve of the two 2/2-way solenoid valves forming the valve system is a backup valve which either connects the control port of the relay valve to the control pressure formed in accordance with the driver's braking input or blocks the connection, and wherein the single additional solenoid valve provided for achieving the drive slip control of the axle is an inlet valve configured as a 2/2-way solenoid valve.

9. The pressure control device of claim 7, wherein the control unit is configured so that drive slip control (ASR) of each individual wheel is achieved by controlling at least the single additional solenoid valve.

10. The pressure control device of claim 8, further comprising:
at least one pressure sensor in pressure-transmitting connection with at least one working port of the relay valve to form an electronic brake system (EBS) with a higher-priority electropneumatic brake circuit and a lower-priority pneumatic brake circuit.

11. The pressure control device of claim 10, wherein the control unit is configured so that it adapts the actual brake pressure measured by the at least one pressure sensor to a desired brake pressure formed in accordance with the driver's braking input by controlling the inlet valve and the outlet valve.

12. The pressure control device of claim 10, further comprising:
a further pressure sensor for measuring the control pressure formed in accordance with the driver's braking input is provided in order to form a vehicle dynamics control system (ESP).

13. The pressure control device of claim 10, wherein the control unit is configured so that it controls at least the valve system and the single additional solenoid valve so that when there is a braking operation initiated by the vehicle dynamics control system (ESP), so that (a) the control port of the relay valve is supplied with the supply pressure of the pressure reservoir in accordance with the yaw rate of the vehicle,
(b) the 2/2-way valve assigned to one brake cylinder on one vehicle side is switched to the through flow position, and
(c) the 2/2-way valve assigned to the other brake cylinder on the other vehicle side is switched to the blocking position.

14. An electronic vehicle brake system (EBS) controlled in accordance with vehicle dynamics, comprising:
a vehicle dynamics control system having at least one pressure control device;
wherein the pressure control device includes:
a pressure control arrangement of a fluid pressure brake system of the vehicle for providing at least brake slip-dependent control of brake pressures in brake cylinders of each individual wheel of an axle;
wherein the pressure control arrangement includes a single relay valve having a supply port that is supplied by a supply pressure, a venting port connected to a pressure sink, a control port and at least two working ports, and wherein one of the working ports is assigned to at least one brake cylinder of a wheel on one vehicle side of the axle and the other of the working ports of the relay valve is assigned to at least one brake cylinder of a wheel on the other vehicle side of the axle,
wherein each of the working ports of the relay valve is connected to a 2/2-way valve, which is controlled directly or indirectly by a control unit and assigned to a respective vehicle side and which either establishes a connection between the relevant working port of the relay valve and the assigned brake cylinder or blocks the connection, depending on actuation by the control unit, and
wherein the control port of the relay valve is connectable to a brake control pressure formed in accordance with the driver's braking input, to a supply pressure of a pressure reservoir or to a pressure sink by a valve system formed by one 3/2-way solenoid valve or by two 2/2-way solenoid valves and controlled by the control unit.

15. A brake system of a vehicle, comprising:
at least one pressure control device, which includes:
a pressure control arrangement of a fluid pressure brake system of the vehicle for providing at least brake slip-dependent control of brake pressures in brake cylinders of each individual wheel of an axle;
wherein the pressure control arrangement includes a single relay valve having a supply port that is supplied by a supply pressure, a venting port connected to a pressure sink, a control port and at least two working ports, and wherein one of the working ports is assigned to at least one brake cylinder of a wheel on one vehicle side of the axle and the other of the working ports of the relay valve is assigned to at least one brake cylinder of a wheel on the other vehicle side of the axle,
wherein each of the working ports of the relay valve is connected to a 2/2-way valve, which is controlled directly or indirectly by a control unit and assigned to a respective vehicle side and which either establishes a connection between the relevant working port of the relay valve and the assigned brake cylinder or blocks the connection, depending on actuation by the control unit, and wherein the control port of the relay valve is connectable to a brake control pressure formed in accordance with the driver's braking input, to a supply pressure of a pressure reservoir or to a pressure sink by a valve system formed by one 3/2-way solenoid valve or by two 2/2-way solenoid valves and controlled by the control unit.

* * * * *